US007472271B2

(12) United States Patent
Brebner et al.

(10) Patent No.: US 7,472,271 B2
(45) Date of Patent: Dec. 30, 2008

(54) METHODS AND DEVICES RELATING TO DISTRIBUTED COMPUTING ENVIRONMENTS

(75) Inventors: Gavin Brebner, St. Martin d'Uriage (FR); Mihaela Gittler, Corenc (FR); Dominique Vicard, Bernin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 10/793,650

(22) Filed: Mar. 5, 2004

(65) Prior Publication Data

US 2005/0005111 A1   Jan. 6, 2005

(30) Foreign Application Priority Data

Mar. 6, 2003   (EP)   .................... 03290545

(51) Int. Cl.
    *G06F 9/00* (2006.01)
(52) U.S. Cl. .................. 713/161; 713/168; 713/169
(58) Field of Classification Search ........... 713/161, 713/168, 169
    See application file for complete search history.

(56) References Cited

FOREIGN PATENT DOCUMENTS

WO   WO 02 071217   9/2002

OTHER PUBLICATIONS

Popescu-Zeletin R et al: "A service platform for distributed applications" Distributed Computing Systems, 1992., Proceedings of the Third Workshop on Future Trends of Taipei, Taiwan Apr. 14-16, 1992, Los Alamitos, CA, USA, IEEE XOMPUT. Soc. US. XP010028303—ISBN 0-8186-2755-7.

Mahim Mishra: "Active Networks" CS625: Advanced Computer Networks, 1999.

D. Larrabetti, M. Calderon, A. Azcorra, M. Ureuena: "Active Networks in NGN: Theory and Reality" Departmento De Ingenieria Telematica-Univerisidad Carlos III De Madrid, 2002.

D Scott Alexander et al: "Security in Active Networks" Bell Labs, Lucent Technologies; Distributed System Lab, CIS Department University of Pennsylvania, 1999.

*Primary Examiner*—Thomas R Peeso

(57) ABSTRACT

The suitability of a service provider for performing a task having a sensitivity level is gauged by using a trust level associated with the provider, in conjunction with the sensitivity level, to gauge whether or not to allocate the task to the service provider.

35 Claims, 2 Drawing Sheets

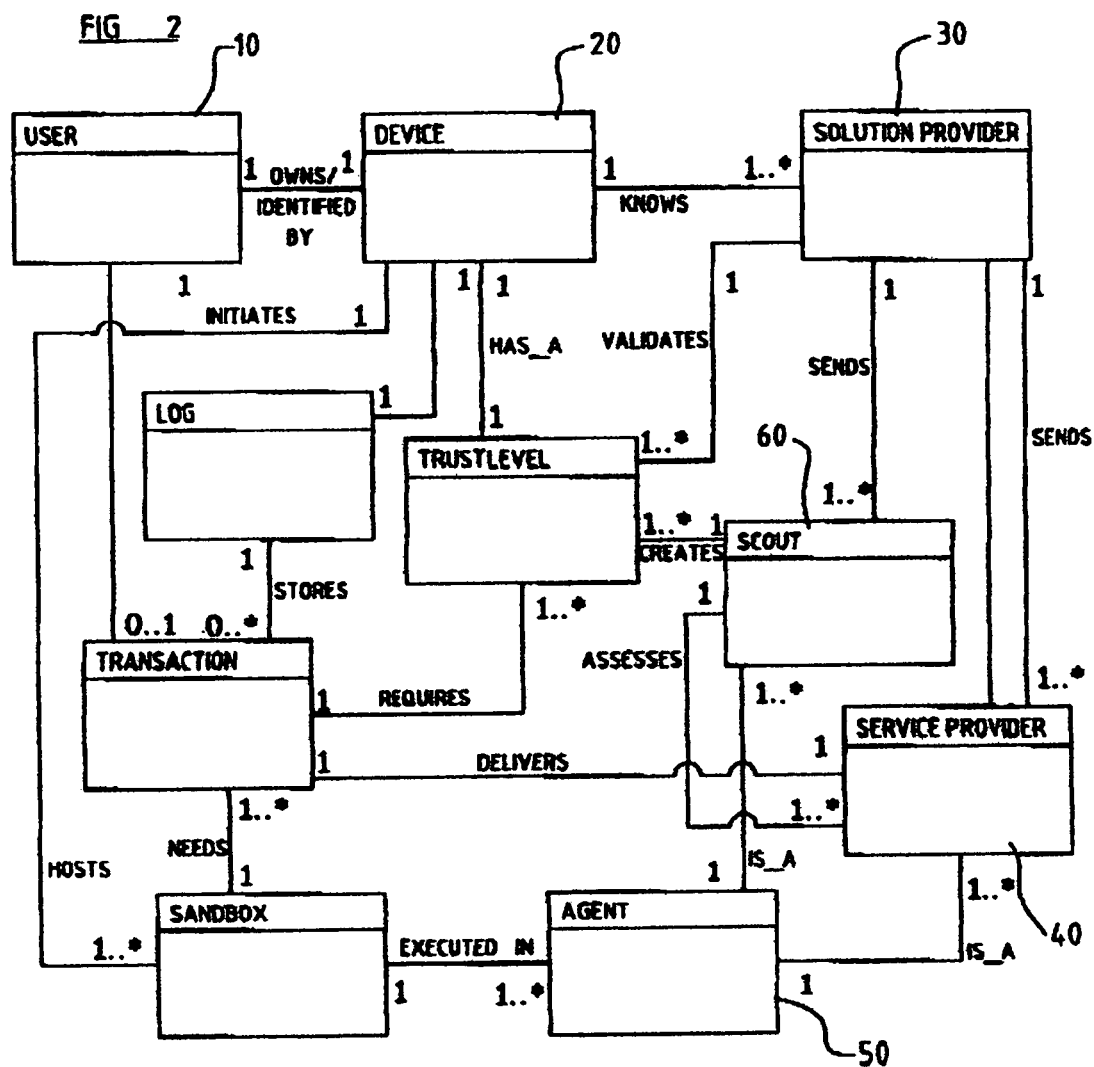

METHODS AND DEVICES RELATING TO DISTRIBUTED COMPUTING ENVIRONMENTS

RELATED APPLICATION

The present application is based on, and claims priority from, EP Application Number 03290545.7, filed Mar. 6, 2003, the disclosure of which is hereby incorporated by reference herein in its entirety.

FIELD OF THE INVENTION

This invention relates, in broad terms, to the general field of computer remote network environments and relates, in particular, to methods and devices used in conjunction with distributed computing environments in which data processing capabilities are provided by a plurality of distinct—and often remote—entities. More specifically, the invention addresses security issues that arise in consequence of such distributed infrastructures and addresses, in particular, concerns relating to data privacy, data corruption and data processing integrity.

BACKGROUND OF THE INVENTION

It is known, in the field of computer network environments, to provide data processing capabilities on a distributed basis, in which processing power, data storage facilities, communication mechanisms and various applications are located—and hence provided at—a number of distinct and often disparate physical locations.

As will be understood by those well-versed in the relevant art, an advantage of this distributed approach is that computational and data-handling loads can be shared between a number of entities, often operating in parallel, resulting in an improvement in data processing efficiency, speed of operation and accuracy of results.

In the Internet world, service providers (e.g. Application Service Providers—ASPs) offer access, to individual users and corporate enterprises, to services (e.g. applications) that would otherwise need to be present in their own personal or corporate computer environment. Whilst this offers benefits in that specialised (perhaps rarely-used) applications can be made available to individuals, that would be expensive to install and maintain on a local basis, the distributed approach does give rise to security concerns on the basis that data used by such remote applications and services, for example, can be susceptible to corruption, theft and loss, for example.

As personalised services evidently require sensitive personal data if they are to be able to perform properly, it is important for users and intermediate Solution Providers (in effect, portals linking users to remote ASPs) have trust in the data-processing environments to which the sensitive data is dispatched.

As will be understood, these data-processing environments (known as execution environments) constitute the space where code (and perhaps data) from the service provider is brought together with user-specific data to allow the remote service to be performed. In a distributed arrangement of the type to which this invention relates, this execution environment could be located at a number of different remote locations, such as on a user device, an ASP per se or perhaps even a Grid element, where a Grid computing arrangement is being utilised.

The important point is that neither the end user nor service provider will necessarily be aware of exactly where the data-processing will take place, with the uncertainty giving rise, at least in part, to the trust requirement mentioned above.

Sony International (Europe) GmbH, in their European patent application EP 1067457 A1, address this issue with the use of so-called trust tokens that are awarded to network nodes that meet the trust requirements of a trust centre. In the event that a mobile agent, present on the network, wishes to migrate to a particular network, a simple yes/no check is effected to establish whether or not that node has been awarded a trust token, so that migration of the agent may be restricted to nodes to whom such tokens have been awarded.

SUMMARY OF THE INVENTION

In accordance with one aspect of the present invention, there is provided, in a distributed computing environment, a method of gauging the suitability of a service provider for performing a task having a sensitivity level, the method comprising using a trust level associated with the provider, in conjunction with the sensitivity level, to guage whether or not to allocate the task to said service provider.

The trust level can be obtained by an investigative process, conveniently using an assessment of the execution environment of the service provider.

The investigative process is preferably carried out using a scout, with the scout's behaviour in the execution environment preferably being taken into account. In a preferred embodiment, the scout comprises a mobile software agent.

The agent is preferably adapted to mimic or otherwise operate in a similar manner to that of a task agent entrusted with performance of the task in issue.

The scout, subsequent to carrying out the investigative process, is preferably operative to pass its findings to a solution provider, associated with a plurality of service providers.

The trust level is preferably given by the service provider in the form of a trust attribute.

The trust level is preferably determined, by the service provider, in a heuristic manner.

The trust level is preferably affected by the presence or otherwise of a secure execution environment, such as, for example, a Java sandbox.

In a preferred embodiment, the trust attribute is compared with a trust level assessed by way of an investigative process.

The investigative process is preferably carried out using a scout that is conveniently provided by a mobile software agent.

The scout is preferably dispatched, and conveniently generated, by the solution provider.

Those well-versed in the relevant field will appreciate, from the foregoing, that the inclusion of the sensitivity level of the task in issue, in the suitability gauging process, allows a dynamic and intelligent assessment to be made. By way of example, in the case of a highly sensitive task, in which the data involved is personal and confidential, such as a user's credit card details, the "margin for error" will be low, in that a high degree of trust will be required, in the service provider concerned. On the other hand, if all that is required, for example, is a relatively simple data mining operation or translation (perhaps from English to French text), the user will very likely have far less concerns over the integrity and privacy of the data being dispatched. Under such circumstances, therefore, a lower trust level might well be acceptable, meaning that an "acceptable" trust level may in fact have many different values, where differing sensitivity levels apply to the various tasks in issue.

In accordance with another aspect of the present invention, there is provided, in a distributed computing environment, a method of gauging the suitability of a service provider for performing a task, comprising obtaining, from the service provider, a trust attribute giving an indication of the apparent trustworthiness of the provider, and comparing the trust attribute with an assessed trust level of the provider, the assessment being carried out by way of an investigative process.

The trust level preferably takes account of environmental factors such as the security of the execution environment, the trustworthiness of the operating platform and the presence or otherwise of remote access restrictions.

The another aspect of the present invention is based on a realisation that the mere fact that a particular service provider claims to have a certain degree of trustworthiness does not, in fact, mean that the service provider can be trusted to that extent. This is because a past analysis of the trustworthiness of the provider concerned cannot always be relied on to certify that the provider, at a later runtime, will still benefit from the originally-determined level of trust.

In accordance with a further aspect of the present invention, there is provided a scout for assessing, in a computer network environment, the trustworthiness of a service provider. The scout has a data-gathering element operative to investigate a plurality of factors affecting the trustworthiness of the provider, and a dispatch element operative to convey a resulting trust level towards a tasking node of the network.

In a preferred embodiment, the scout comprises a mobile software agent.

The agent is preferably adapted to mimic or otherwise operate in a manner similar to that of an execution agent operative, upon receipt by the tasking node of a satisfactory trust level, to carry out a task for which the trustworthiness assessment was required.

In accordance with an additional aspect of the present invention, there is provided an execution agent operative, in a computer network environment, to perform a task. The agent has a trust-sensitive element operative, during performance of the task, to monitor the trustworthiness of the execution environment and to modify its behaviour in accordance therewith.

The trust sensitive element is preferably operative, alternatively or in addition, to monitor its own perceived trust level.

In this way, the execution element can have a local trust policy, in effect setting out the nature of the various actions that the agent is trusted, by a user, to perform setting out the nature of the various actions that the agent is trusted. This allows the agent, in addition to monitoring its surroundings, to check, on a continual, periodic or otherwise repeated basis, whether or not the agent continues to enjoy that level of trust and whether, therefore, performance of the task should be continued.

In accordance with an added aspect of the present invention, there is provided, in a computer network, a method of performing a task in an execution environment wherein, during performance of the task, the trustworthiness of the environment is monitored so that the performance can be modified, halted or postponed if the trustworthiness falls below a threshold.

In accordance with a still further aspect of the present invention, there is provided, in a distributed network environment, a service execution method comprising initiating the performance of the task by a service provider and monitoring, during performance of the task, the trustworthiness of the execution environment and/or an agent responsible for performance of the task. If the trustworthiness of either falls below a threshold, performance of the task can be modified, halted, postponed or assigned to a different provider.

The various aspects of the present invention discussed above may each comprise one or more of the features described in relation to the other aspects.

BRIEF DESCRIPTION OF THE DRAWINGS

Specific and non-limiting embodiments of the present invention, in its various aspects, will now be described in greater detail, but strictly by way of example only, with reference to the following drawings of which:

FIG. 2 is a domain model, showing the operative and hierarchical relationships existing between the key components involved in implementing the methods.

DETAILED DESCRIPTION OF THE DRAWINGS

Figure 1:
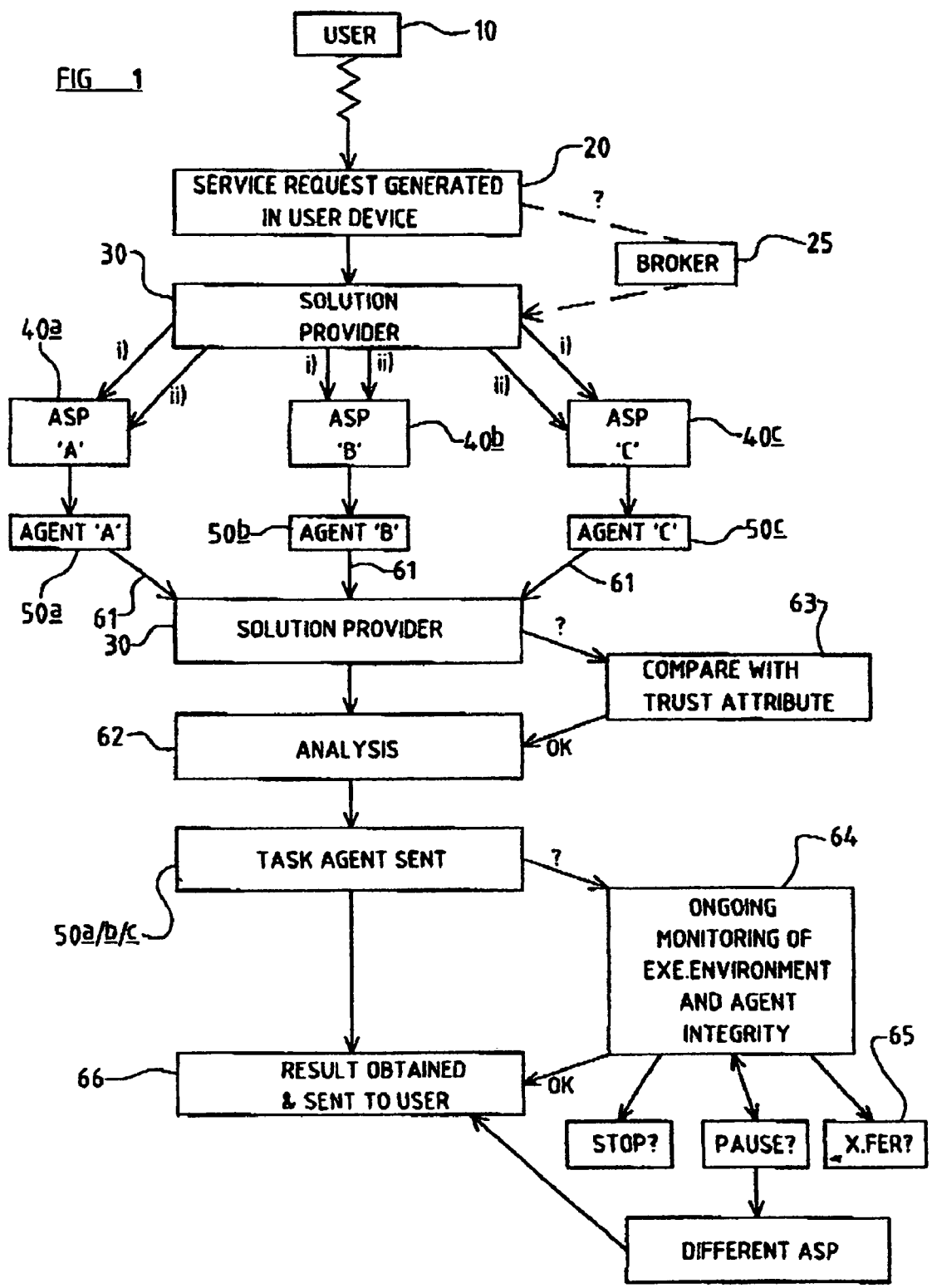
FIG. 1 is a flow diagram illustrating the principal steps involved in the performance of the methods disclosed.

As outlined above, the invention relates to the field of distributed computing environments such as those provided over web platforms and which allow a variety of data processing entities and services to reside at a plurality of remote, disparate, locations. In the preferred embodiment described herein, the scenario envisages a user 10, connected to a computer network by way of a mobile device 20 such as a PDA or the like, whereby a number of remote services, exposed by service providers 40a, 40b and 40c may be invoked by the user, in response to an appropriately-formulated service request. Access to the services is facilitated by the involvement of an intermediate solution provider 30 which, in this example, functions as a service portal, in that the solution provider receives a service request from the device 20, optionally using a middleware broker 25, and then identifies the remote service providers 40a, 40b, and 40c, together with associated service agents 50a, 50b and 50c which will be used in the performance of the task required.

Whilst the solution provider may also procure trust attributes relating to the identified service providers, giving a self-determined indication of the levels of trustworthiness of the providers concerned, the solution provider, in this example, is operative to dispatch scout agents 60 towards the service providers 40a, 40b and 40c so that an actual assessment of the trust level associated with the providers may be made.

In that regard, it will be understood that the trustworthiness of the providers will be influenced by the nature of the allied service execution environments, such as the provision or otherwise of a secure execution environment, (e.g. a Java sandbox), the perceived trustworthiness of an extant operating system and the presence of any external communications devices, with the scout agent 60, responsible for the trust level assessment, thus being operative to carry out a reconnoitre of the service execution environment, prior to the requested task actually being performed.

The inquisitive and intelligent nature of the assessment lends itself especially well to the use of mobile software agents which, as will be understood to those skilled in the relevant field, are able not only to move around a network environment, in a nomadic manner, but also are able to sense changes in their surroundings and to modify their behaviour patterns in the light of what is found. In this example, the scout agent 60 might ask itself whether it is operating in an expected time zone (if it is not, it is likely that the agent is not at the physical location it is supposed to be at) and whether, for example, any other applications are present, in addition to the proximity of any access control devices such as internet firewalls and the like. In an effort to assess the external security of the execution environment, the agent may be operative, for example, to attempt to contact an external network entity, such as be effecting a "ping" operation to a remote internet website. A successful communication of this type could indicate that the execution environment is not secure, on the basis that the ability to send an outbound message implies that a risk exists that a malicious inbound message or virus could be received.

As shown at step 61, the assessed trust levels are returned to the solution provider 30 so that an analysis step 62 may be effected. As shown in FIG. 1, an intermediate analysis step 63 may optionally be carried out, in which the trust levels assessed by the scout agent 60 are compared with trust attributes provided by the service providers themselves, so as to verify that the actual trustworthiness of the service providers tallies—to a sufficient degree—with the actual levels assessed by the scout agent 60. The analysis step 62 takes account not only of the assessed trust levels but, importantly, also takes account of the level of sensitivity (not shown in the drawings) of the task to be performed by a task agent 50*a*/50*b*/50*c*. Where the task to be performed is "privacy critical", in that the data being used must not be compromised in any way, a relatively high trust level, as assessed by the scout agent 60, will be required before the solution provider will dispatch the task agent to the service provider, so as to allow performance of the task. On the other hand, where the nature of the task is not so sensitive, or where a high degree of accuracy in the resulting data is not important, a lower trust level could be acceptable, meaning that an alternative service provider could be charged, by the solution provider, with the performance of the task.

In addition to assessing the trust level of the service execution environment prior to initiation of the performance of the task, it can also be prudent to monitor the trustworthiness of the environment and task agent during performance of the task in question. It will be understood that, during runtime of the task agent code, external factors such as inbound messages and the integrity of the physical device at which the execution environment is hosted may have a material effect on the overall trustworthiness of the service provider. Similarly, whilst a particular task agent may initially be trusted to a particular degree, corruption of the task agent code during runtime cannot be ruled out, meaning that an apparently secure environment could become less secure—and hence less trusted—as the service is being provided. To lessen these risks, an additional monitoring step 64 is provided, in this preferred embodiment, so that a real-time and ongoing assessment is made of the overall service execution operation. In the event that the perceived trustworthiness of either the execution environment or the task agent concerned falls below a given threshold, performance of the task may, optionally, be halted, paused or transferred to an alternative service provider whose trustworthiness is better suited to the task concerned. This is shown at step 65, with the final step (transmission of the resulting data) being shown at step 66.

It is also envisaged by the applicants that multiple scout agents could perhaps be employed. Thus, the trust assessment could commence using a single scout, with that scout then being operative to call for additional (perhaps more sophisticated) scouts, under certain circumstances. Thus, whilst a single (relatively unsophisticated) scout might be able to assess a level of trust on a broad basis, where a more accurate trust level assessment is required, more complex scout agents could be employed.

The use of multiple scouts might also provide benefits in the event that a proposed execution environment turns out to be malicious. Thus, whilst a proposed execution environment may appear "safe" at first sight, the use, subsequently, of a second scout could be beneficial in an attempt to check that the level of trust perceived by the first scout remains unchanged upon subsequent assessments.

It should also be understood that direct input from a user could be used to gauge/assess the suitability of a proposed execution environment. Thus, a user could convey a feeling of uneasiness if, for example, he/she should become aware of any issues (such as an Internet virus attack) that might affect the suitability of the proposed environment.

Taking a "real life scenario" to provide an indication of the commercial and industrial applicability of these methods and devices, one might consider a scenario in which a family is desirous of booking a holiday via an Internet travel booking portal. Holiday arrangements generally need to take account of both age criteria, destination preferences and medical data, with the data (in this example) being the most sensitive, in that unauthorised access thereto should be restricted, wherever possible. Booking a vacation through an on-line service (in practice, a portal to a selection of holiday service providers) requires this data to be conveyed by the user, with the data perhaps being processed, by the portal, by the most economically-viable ASP available at that time. It is of course important that the holiday portal enjoys the trust of the user and it is thus imperative that the portal can ensure that the chosen ASP is in fact trustworthy. The methods and devices discussed above allow this to be effected, by the use of scout agents sent to the ASPs before the sensitive data is executed.

As another scenario, one might consider the fact that a person has many different "identities" in the on-line world, by virtue of shop loyalty cards, bank identification information, school details, medical records and the like. Performance of tasks using these data will very likely have different levels of sensitivity with it thus being important, for example, to ensure that one's medical and financial information is treated with a far higher degree of confidence than one's shop loyalty card shopping preferences, for example.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of gauging the suitability of a service provider for performing a task having a sensitivity level, the method comprising gauging whether or not to allocate the task to said service provider by using a trust level associated with the provider, in conjunction with the sensitivity level.

2. A method according to claim 1 further including obtaining the trust level by using an investigative process.

3. A method according to claim 2 further including obtaining the trust level by using an assessment of the execution environment of the service provider.

4. A method according to claim 2 further including carrying out the investigative process by using a scout.

5. A method according to claim 4 wherein the scout's behavior in the execution environment is taken into account.

6. A method according to claim 4 wherein the scout includes a mobile software agent.

7. A method according to claim 6 wherein the agent mimics or operates in a similar manner to that of a task agent entrusted with performance of the task in issue.

8. A method according to claim 4 wherein the scout, subsequent to carrying out the investigative process, passes its findings to a solution provider associated with a plurality of service providers.

9. A method according to claim 8 further comprising dispatching the scout by the solution provider.

10. A method according to claim 1 wherein the trust level is given by the service provider in the form of a trust attribute.

11. A method according to claim 10 further comprising determining, by the service provider, the trust level in a heuristic manner.

12. A method according to claim 10 wherein the trust level is affected by the presence or otherwise of a secure execution environment.

13. A method according to claim 10 further including comprising the trust attribute with a trust level assessed by an investigative process.

14. A method according to claim 13 wherein the process is carried out using a scout.

15. A method according to claim 14 wherein the scout includes a mobile software agent.

16. A method according to claim 1 further including obtaining the trust level by using an assessment of the execution environment of the service provider.

17. A method according to claim 16 wherein the trust level takes account of at least one environmental factor, the security of the execution environment, the trustworthiness of the operating platform and the presence or otherwise of remote access restrictions.

18. A method according to claim 17 wherein the at least one environmental factor includes the security of the execution environment.

19. A scout according to claim 17 wherein the agent is arranged to mimic or operate in a manner similar to that of an execution agent operative, upon receipt by the tasking node of a satisfactory trust level, to carry out a task for which the trustworthiness assessment was required.

20. A method of gauging the suitability of a service provider for performing a task, comprising obtaining, from the service provider, a trust attribute giving an indication of the apparent trustworthiness of the provider, and comparing the trust attribute with an assessed trust level of the provider, the assessment being carried out by an investigative process.

21. A scout for assessing, in a computer network environment, the trustworthiness of a service provider, the scout having a data-gathering element operative to investigate a plurality of factors affecting the trustworthiness of the provider, and a dispatch element operative to convey a resulting trust level towards a tasking node of the network.

22. A scout according to claim 21 wherein the scout comprises a mobile software agent.

23. An execution agent according to claim 22 wherein the trust-sensitive element is operative, alternatively or in addition, to monitor its own perceived trust level.

24. An execution agent operative, in a computer network execution environment, to perform a task, the agent having: a trust-sensitive element operative, during performance of the task, to monitor the trustworthiness of the execution environment and to modify the behavior of the execution environment in accordance with the execution environment.

25. A method of performing a task in an execution environment of a computer network, the method comprising monitoring trustworthiness of the environment during performance of the task in such a way that the performance can be modified, halted or postponed in the event that the trustworthiness falls below a threshold.

26. The method of claim 25 further including modifying the performance in the event that the trustworthiness falls below a threshold.

27. The method of claim 25 further including halting the performance in the event that the trustworthiness falls below a threshold.

28. The method of claim 25 further including postponing the performance in the event that the trustworthiness falls below a threshold.

29. The method of claim 25 further including halting the performance, or postponing the performance in the event that the trustworthiness falls below a threshold.

30. A service execution method in a distributed network environment, the method comprising initiating performance of a task by a service provider and monitoring, during performance of the task, the trustworthiness of at least one of the execution environment and an agent responsible for performance of the task in such a way that if the trustworthiness of at least one of the execution environment and the agent falls below a threshold, performance of the task can be modified, halted, postponed or assigned to a different provider.

31. The method of claim 30 further including modifying, halting, postponing or assigning to a different provider the performance of the task if the trustworthiness of at least one of the execution environment and the agent falls below the threshold.

32. The method of claim 30 further including modifying the performance of the task if the trustworthiness of at least one of the execution environment and the agent falls below the threshold.

33. The method of claim 30 further including halting the performance of the task if the trustworthiness of at least one of the execution environment and the agent falls below the threshold.

34. The method of claim 30 further including postponing the performance of the task if the trustworthiness of at least one of the execution environment and the agent falls below the threshold.

35. The method of claim 30 further including assigning to a different provider the performance of the task if the trustworthiness of at least one of the execution environment and the agent falls below the threshold.

* * * * *